(12) United States Patent
Park

(10) Patent No.: US 6,491,734 B1
(45) Date of Patent: Dec. 10, 2002

(54) AIR CLEANER FOR INTERNAL COMBUSTION ENGINE WITH INTERNALLY FORMED AIR INLET PIPE

(75) Inventor: Kee-Youn Park, Cheollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/656,909

(22) Filed: Sep. 7, 2000

(30) Foreign Application Priority Data

Nov. 23, 1999 (KR) .............................................. 99-52069

(51) Int. Cl.[7] .............................................. B01D 45/06
(52) U.S. Cl. ............................ 55/385.3; 55/434; 55/433
(58) Field of Search ....................... 55/319, 320, 385.3, 55/418, 432, 433, 434

(56) References Cited

U.S. PATENT DOCUMENTS

| | | | | |
|---|---|---|---|---|
| 1,129,755 A | * | 2/1915 | Suprunowski | 55/433 |
| 3,721,069 A | * | 3/1973 | Walker | 55/319 |
| 6,312,488 B1 | * | 11/2001 | Fischer | 55/315 |

* cited by examiner

*Primary Examiner*—Robert A. Hopkins
(74) *Attorney, Agent, or Firm*—Christie, Parker & Hale, LLP

(57) ABSTRACT

An air cleaner for an internal combustion engine includes a body having a chamber space, an air inlet pipe connected to the body for introducing air into the chamber space, a drain cock formed on a bottom surface of the body for collecting particles and moisture present in the introduced air, and a drain valve mounted to the drain cock for discharging the particles and moisture. The air inlet pipe is integrally formed with the body and is not inserted in the body.

5 Claims, 1 Drawing Sheet

AIR CLEANER FOR INTERNAL COMBUSTION ENGINE WITH INTERNALLY FORMED AIR INLET PIPE

BACKGROUND OF THE INVENTION (a) Field of the Invention

The present invention relates to an air cleaner for an internal combustion engine, and in particular, to an improved air cleaner that enhances engine performance by integrally forming an air cleaner body and an air inlet pipe.

(b) Description of the Related Art

An air cleaner is needed to protect an engine and fuel system by removing dirt, abrasive particles and other foreign substances, as well as moisture present in the air before the air is supplied to the engine and fuel system. The air cleaner may be mounted to a carburetor air horn, fuel injection throttle body, or intake manifold by an air transfer duct.

FIG. 3 shows a prior art air cleaner. All incoming air is introduced into a cleaning chamber 104 defined by a housing 101 through an air inlet pipe 102 such that the air undergoes an initial cleaning process. That is, relatively large particles and moisture present in the air drop downwardly by the gravity exerted on these substances. The air having gone through the initial cleaning process then passes through the air filter before entering an engine such that the air undergoes a second cleaning process. The large particles and moisture that drop after entering the cleaning chamber 104 collect in a drain outlet 106 formed on a bottom surface of the housing 101 to be discharged through a drain valve 110 mounted to the drain outlet 106 by means of a clamp. The air inlet pipe 102 is connected to the housing 101 by means of a pop-riveting process in a state inserted into the cleaning chamber 104.

In this air cleaner, however, the air inlet pipe 102 and the cleaning chamber 104 are separately manufactured before being connected to each other. Accordingly, it is difficult to completely seal the air inlet pipe 102. Also, the air flow in the cleaning chamber 104 is not smooth because the air inlet pipe 102 is inserted into the cleaning chamber 104.

SUMMARY OF THE INVENTION

The present invention has been made in an effort to solve the above problems of the prior art.

It is an object of the present invention to provide an improved air cleaner capable of completely sealing an air inlet pipe and smoothing an air flow in a cleaning chamber by integrally forming the air inlet pipe and an air cleaner body.

To achieve the above object, the air cleaner for an internal combustion engine comprises a body having a chamber space, an air inlet pipe connected to the body for introducing air into the chamber space, a drain cock formed on a bottom surface of the body for collecting particles and moisture present in the introduced air, and a drain valve mounted to the drain cock for discharging the particles and moisture. The air inlet pipe is integrally formed with the body and is not inserted in the body.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
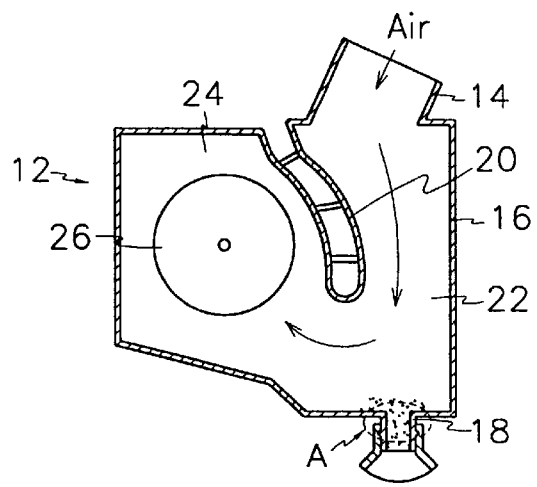
FIG. 1 is a sectional view showing an air cleaner according to a preferred embodiment of the present invention.
Figure 2:
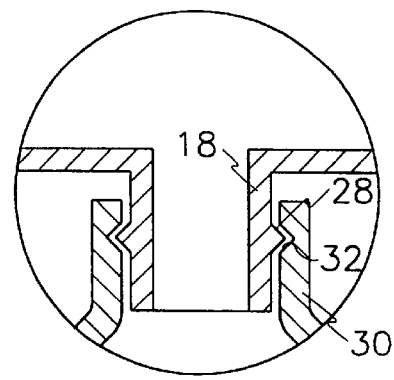
FIG. 2 is an enlarged view of portion "A" of FIG. 1.
Figure 3:
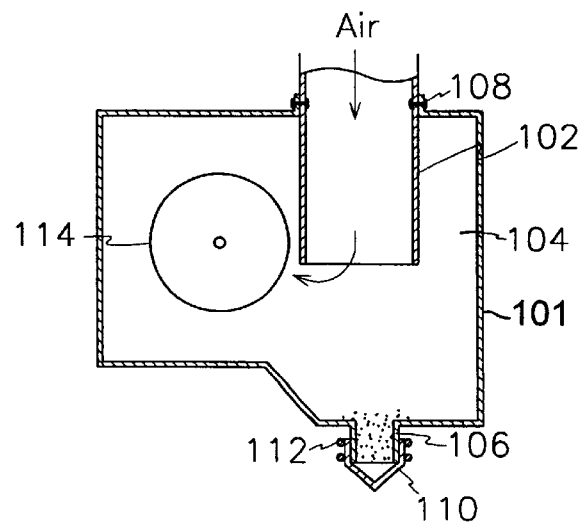
FIG. 3 is a sectional view showing a prior art air cleaner.

FIG. 1 shows an air cleaner according to a preferred embodiment of the present and FIG. 2 is an enlarged view of portion "A" of FIG. 1. Reference numeral 12 in FIG. 1 indicates the air cleaner.

As shown in FIG. 1, the air cleaner 12 comprises a body 16 having an air inlet pipe 14 and a drain cock 18 respectively formed on an upper and lower wall of the body 16, and an outlet opening 26 to which an air filter (not shown) is mounted. The body 16 is provided with a streamline wall 20 extending downwardly from the upper wall of the body 16 a predetermined distance so as to define an inlet side chamber 22 and outlet side chamber 24. The drain cock 18 has a projection 28 circumferentially formed around a middle portion of the drain cock 18 such that a drain valve 30 is locked and unlocked by manipulating the drain valve 30 respectively in an upward and downward direction. Also, the drain valve 30 is provided with an inner circumferential groove 32 in order to engage with the projection 28 of the drain cock 18. The engagement of the projection 28 of the drain cock 18 and the groove 32 of the drain valve 30 provides complete seal.

The filtering operation of the above structured air cleaner according to the present invention will now be described.

Once incoming air is introduced into the inlet side chamber 22 through the air inlet pipe 14, the air is directed toward the streamline wall 20 to be smoothly flowed along the streamline wall 20 then into the outlet side chamber 24. While the air flows from the inlet side chamber 22 to the outlet side chamber 24, large particles and moisture fall downward toward the drain cock 18 by gravity acting on the particles and moisture, thereby undergoing an initial filtering process. The air then passes through the air filter (not shown) mounted to the outlet opening 26. The particles and moisture that drop toward the drain cock 18 are collected in the drain cock 18 formed on the bottom surface of the body 16 and discharged externally through the drain valve 30.

As described above, in the air cleaner of the present invention, the body and the air inlet pipe are integrally formed so as to provide a complete seal. Furthermore, since the air cleaner is provided with the streamline wall for guiding the introduced air, the air smoothly flows along the streamline wall then to the outlet opening to which the air filter is mounted. As a result, a reduction in air intake resistance pressure and intake noise result. Also, the air inlet pipe is integrally manufactured with the body of the air cleaner such that a manual riveting procedure is not required as in the prior art. Accordingly, total manufacturing costs decrease.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An air cleaner for an internal combustion engine comprising:

a body having a chamber space;

an air inlet pipe extending from an inlet wall of the body for introducing air into the chamber space;

an outlet extending from the chamber space;

a streamline wall formed in the chamber space, the streamline wall extending from said inlet wall of the body defining an inlet side chamber space and an outlet side chamber space, such that introduced air smoothly flows from the inlet side chamber space to the outlet side chamber space;

a drain cock formed on a bottom surface of the body for collecting particles and moisture present in the introduced air; and a drain valve mounted to an external surface of the drain cock for discharging the particles and moisture, wherein the drain cock has a circumferential projection around a middle portion of the drain cock, the projection extending outwardly from the drain cock towards the drain valve.

2. The air cleaner of claim 1 wherein the air inlet pipe is integrally formed with the body.

3. The air cleaner of claim 1 wherein the streamline wall is integrally formed with the body.

4. An air cleaner for an internal combustion engine comprising:

a body having a chamber space;

an air inlet pipe extending from a wall of the body for introducing air into the chamber space;

a drain cock formed on a bottom surface of the body for collecting particles and moisture present in the introduced air; and a drain valve mounted to an external surface of the drain cock for discharging the particles and moisture, wherein the drain cock has a circumferential projection around a middle portion of the drain cock, the projection extending outwardly from the drain cock towards the drain valve.

5. The air cleaner of claim 4 wherein the air inlet pipe is integrally formed with the body.

\* \* \* \* \*